United States Patent
Park et al.

(10) Patent No.: US 8,332,752 B2
(45) Date of Patent: Dec. 11, 2012

(54) TECHNIQUES TO DYNAMICALLY MODIFY THEMES BASED ON MESSAGING

(75) Inventors: Seung-Hae Park, Seattle, WA (US); Colin Anthony, Bothall, WA (US); Jose Miranda-Steiner, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 156 days.

(21) Appl. No.: 12/818,862

(22) Filed: Jun. 18, 2010

(65) Prior Publication Data
US 2011/0314390 A1    Dec. 22, 2011

(51) Int. Cl.
*G06F 17/27* (2006.01)
(52) U.S. Cl. ......... 715/255; 715/243; 715/256; 715/271
(58) Field of Classification Search .................. None
See application file for complete search history.

(56) References Cited

U.S. PATENT DOCUMENTS

| | | |
|---|---|---|
| 7,158,986 B1 | 1/2007 | Oliver |
| 2004/0260534 A1* | 12/2004 | Pak et al. ........................... 704/7 |
| 2005/0097463 A1* | 5/2005 | Yu ................................. 715/531 |
| 2008/0040428 A1 | 2/2008 | Wei |
| 2008/0040437 A1* | 2/2008 | Agarwal et al. ............... 709/206 |
| 2009/0163182 A1 | 6/2009 | Gatti |
| 2009/0248824 A1 | 10/2009 | Best |
| 2010/0083170 A1 | 4/2010 | Lim |

OTHER PUBLICATIONS

"Dynamic Wallpaper" Retrieved Mar. 22, 2010, 2 pages. http://sourceforge.net/projects/dynwallpaper/.
Goa, Rajesh Naik Ponda "How to change page theme in asp.net 2.0 dynamically at runtime", Apr. 6, 2007, 3 pages.
Banerjee, Amit, "How to Update Facebook Status Messages from Google Talk", Jul. 16, 2009, 3 pages. http://www.ampercent.com/update-facebook-status-google-talk/2507/.
"Profile for Windows Live", Retrieved Mar. 22, 2010, 1 page. http://windowslive.com/online/profile.
"Update Twitter status as gTalk status message", Jan. 26, 2009, 5 pages. http://www.crankup.net/update-twitter-status-as-gtalk-status-message.
Rao, Leena, "Xoopit Marries Facebook Status Updates With Gmail", TechCrunch, Feb. 13, 2009, 1 page. http://techcrunch.com/2009/02/13/xoopit-marries-facebook-status-updates-with-gmail/.

* cited by examiner

*Primary Examiner* — Kyle Stork
*Assistant Examiner* — Keith Bloomquist

(57) ABSTRACT

Techniques to dynamically modify themes based on messaging. An apparatus may comprise a processor and a memory communicatively coupled to the processor. The memory may store a theme manager component and a user interface component. The theme manager component, when executed by the processor, may be operative to receive a message from a message author and select a theme based on message content of the message. The user interface component, when executed by the processor, may be operative to dynamically display a user interface view with the selected theme. In this manner, a theme associated with a user may be dynamically and automatically modified based on personalized information about a user. Other embodiments are described and claimed.

19 Claims, 9 Drawing Sheets

Windows Live™  510

Home  Profile  People  Mail  Photos  More ▶  MSN ▶

John Doe
Share a quick message — Status Message 504  502

Enter your occupation | Enter your location

Display Area 506

Edit profile details  View invitations  Permissions

John's profile  508

Details
Photos
Photos of John
Network
SkyDrive

About me

Tell people what you're all about. Add interests, information, and more to your profile.

Add profile information

What's new with John

John shared photos in *Test Album*

[Photo 1]  [Photo 2]  [Photo 3]

Permissions | Options

Notes
People can leave notes on your profile. *Edit permissions*

*Network*
Jo Nah
Val Armorr
Ayla Ranzz
Tinya Wazzo

*Favorite things*

*Add a favorite artist*

[ Post ]

Windows Live™

Home   Profile   People   Mail   Photos   More ▶   MSN ▶

510

John Doe
Share a quick message

*I am having fun at the beach!* — 502

504

Enter your occupation | Enter your location

Edit profile details   View invitations   Permissions

506

What's new with John

John shared photos in *Test Album*

| Photo 1 | Photo 2 | Photo 3 |

Permissions | Options

Notes
People can leave notes on your profile. *Edit permissions*

*Network*
Jo Nah
Val Armorr
Ayla Ranzz
Tinya Wazzo

*Favorite things*

*Add a favorite artist*

[ Post ]

508

John's profile
Details
Photos
Photos of John
Network
SkyDrive

About me
Tell people what you're all about. Add interests, information, and more to your profile.

Add profile information

RECEIVE A MESSAGE HAVING MESSAGE CONTENT FROM A MESSAGE AUTHOR
602

DETERMINE PERSONAL INFORMATION ABOUT THE MESSAGE AUTHOR FROM THE MESSAGE CONTENT OF THE MESSAGE
604

SELECT A THEME BASED ON THE PERSONAL INFORMATION
606

DISPLAY A USER INTERFACE VIEW WITH THE SELECTED THEME
608

TECHNIQUES TO DYNAMICALLY MODIFY THEMES BASED ON MESSAGING

BACKGROUND

Certain techniques have been developed to personalize software applications for a user in an effort to enhance an overall user experience for a given computing or communications environment. For instance, a graphical user interface (GUI) may display various GUI elements according to a certain theme. A theme is a collection of attributes and graphical elements that can be utilized to customize the look of an application program or a web page. For instance, a theme may specify the colors, text size, font, static or moving graphics or video, page layout, and other stylistic elements that can be utilized to customize the visual appearance of a desktop or web application. When used in conjunction with a desktop application program, themes may also allow the customization of other visual elements, such as the size and shape of a user interface window generated by the application program. In some implementations a theme may also allow the customization of audible elements, such as user interface feedback sounds.

In typical implementations, a user may select a theme to personalize or customize an application or web page. However, there may be instances where a user is unable or unwilling to select a theme. For instance, it may be inconvenient for a user to constantly change a theme, a user may not know how to change a theme for a particular GUI, or a user may utilize a device with limited computing and/or communications capabilities making it difficult or impossible to change a theme. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques to dynamically and automatically change a theme based on messaging. Some embodiments are particularly directed to techniques to dynamically and automatically change a theme based on message content of a message authored by a person referred to as a message author. The message content may provide certain personal information for a message author, such as whether the user is angry or excited, engaging in an activity such as a sport, a location for the user, and other information personal and otherwise directly attributable to a message author.

In one embodiment, for example, an apparatus such as a computing device may comprise a processor and a memory communicatively coupled to the processor. The memory may store, among other software components, a theme manager component and a user interface component. The theme manager component, when executed by the processor, may be operative to receive a message from a message author and select a theme based on message content of the message. The user interface component, when executed by the processor, may be operative to dynamically display a user interface view with the selected theme. In this manner, a theme associated with a user may be dynamically and automatically modified based on personal information about a person authoring a message. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 5A illustrates an embodiment of a GUI view of a profile page before application of a theme selected by a theme manager component.

FIG. 5B illustrates an embodiment of a GUI view of a profile page after application of a theme selected by a theme manager component.

FIG. 6 illustrates an embodiment of a logic flow for a dynamic theme selection system.

DETAILED DESCRIPTION

Various embodiments are generally directed to techniques to dynamically and automatically change a theme based on messaging. Some embodiments are particularly directed to techniques to dynamically and automatically change a theme based on message content of a message authored by a person referred to as a message author. The message content may provide certain personal information for a message author, such as whether the user is angry or excited, engaging in an activity such as a sport, a location for the user, and other information personal and otherwise directly attributable to a message author. The personal information about a user may be reflected in a particular theme. For instance, personal information may indicate that a user is on vacation at the beach, playing a soccer game, or in a meeting. A current GUI theme may be changed to a beach GUI theme, a soccer GUI theme, or a business GUI theme. In this manner, a theme associated with a user may be dynamically and automatically modified based on personal information about a user derived from information associated with a message sent by the user. For instance, a theme for a profile page of a social networking service may be updated in real-time based on content of status messages for a user. Dynamically and automatically modifying themes based on messages may improve user experiences for both a user and those having a relationship with the user, such as friends in a social network. Such techniques allow customization and personalization of software tools to enhance a public persona, convey enhanced status information, or otherwise tailor generic software tools to an individual or group of individuals.

Figure 1:
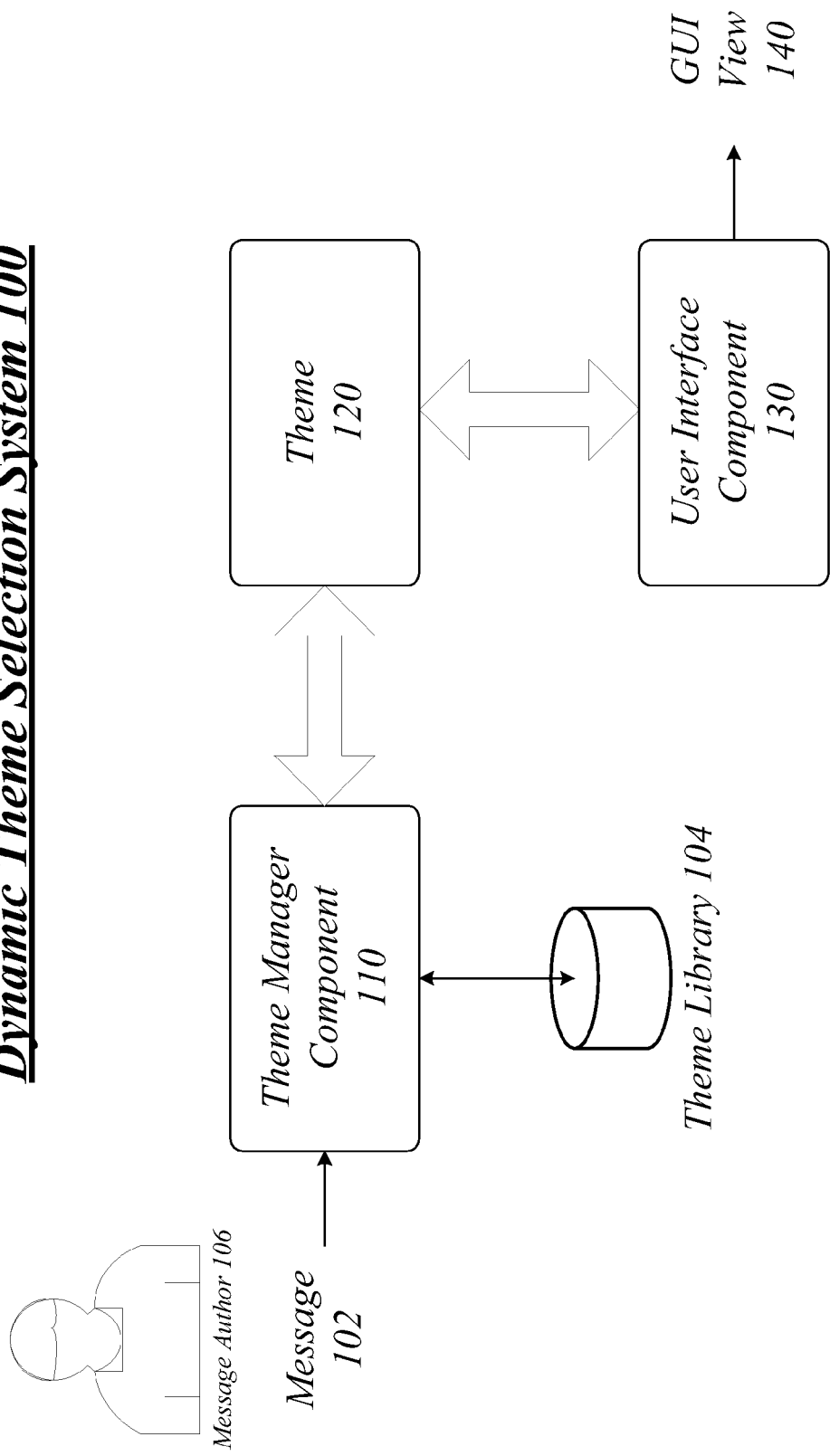
FIG. 1 illustrates an embodiment of a first dynamic theme selection system.

FIG. 1 illustrates a block diagram for a system 100 to dynamically manage themes for a GUI. In one embodiment, for example, the system 100 may comprise a computer-implemented system 100 having multiple components 110, 130. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the system 100 may be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the system 100 as shown in FIG. 1 has a limited number of elements in a certain topology, it may be appreciated that the system 100 may include more or less elements in alternate topologies as desired for a given implementation.

The components 110, 130 may be communicatively coupled via various types of communications media. The components 110, 130 may coordinate operations between each other. The coordination may involve the uni-directional or bi-directional exchange of information. For instance, the components 110, 130 may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, an apparatus such as a computing device may comprise a processor and a memory communicatively coupled to the processor. The memory may store a theme manager component 110 and a user interface component 130. The theme manager component 110, when executed by the processor, may be operative to receive a message 102 from a message author 106 and select a theme 120 based on message content from the message 102. The user interface component 130, when executed by the processor, may be operative to dynamically display a GUI view 140 with the selected theme 120.

In various embodiments, the system 100 may comprise the theme manager component 110. The theme manager component 110 may be generally arranged to manage theme selection based on message content from a message 102 as authored by the message author 106. In one embodiment, the theme manager component 110 may receive as input the message 102 from a communications or messaging application, select a theme 120 from a theme library 104 based on message content of the message 102, and output the theme 120 to a user interface component 130. The user interface component 130 may generate and display a GUI view 140 with the theme 120, thereby personalizing the GUI view 140 based on personal information about the message author 106.

The message 102 may comprise any type of message in a variety of message formats as generated and/or transported by any number of different communications or messaging applications. Examples for the message 102 may include without limitation a unified messaging (UM) message, an e-mail message, a voicemail message, an instant messaging (IM) message, a group IM message, a presence message, a short message service (SMS) message, a multimedia message service (MMS) message, a facsimile message, a gaming message, a social networking service (SNS) message, and/or other types of messages generated or transported by various communications and/or messaging programs, applications, or services in accordance with the described embodiments. The embodiments are not limited in this context.

In one embodiment, for example, the message 102 may comprise a status message for a social networking service (SNS). Examples of SNS may include without limitation MICROSOFT WINDOWS LIVE, MYSPACE™, FACEBOOK™, LINKEDIN™, TWITTER™, BEBO™ and other social networking services consistent with the described embodiments. The embodiments are not limited in this context.

In various embodiments, the theme manager component 110 may receive the message 102 and select a theme 120 based on message content from the message 102. The theme manager component 110 may select the theme 120 based on some form of personal information about the message author 106 determined from message content of the message 102 as authored by the message author 106. The personal information may be determined from the message content of the message 102 using any number of language recognition techniques as described with reference to FIG. 2. The theme manager component 110 may use various language recognition techniques to output either key words, derived key words or some combination of key words and derived key words representing an approximate meaning or context for the message 102 as originally intended by the message author 106.

The theme manager component 110 may search a theme library 104 using one or more key words or derived keywords, and retrieve a theme 120 associated with the one or more key words or derived keywords from the theme library 104. The theme library 104 may be generally arranged to store one or more themes associated with one or more key words or derived key words from message content of the message 102. The theme library 104 may store a data structure, such as a look-up table, containing various themes indexed by one or more key words or derived key words. In one embodiment, the theme library 104 may have a single key word or derived key word associated with a particular theme. For instance, a word "beach" may be associated with a beach theme. In one embodiment, the theme library 104 may have combinations of key words or derived key words associated with a particular theme. For instance, words such as "beach at Emerald Isle, N.C." may be associated with a beach theme specific to Emerald Isle, N.C., such as a beach theme with a particular graphic or picture of Emerald Isle, N.C. It may be appreciated that the theme library 104 may store any number of key words or derived key words associated with any number of particular themes as desired for a given implementation. The embodiments are not limited in this context.

The theme library 104 may store any number of key words or derived key words and associated themes. In some embodiments, the one or more key words or derived key words may be stored as textual information, such as words, phrases, punctuation, grammar, syntax, and so forth. In some embodiments, the one or more key words or derived key words may be stored as multimedia information, such as pictures, graphics, icons, emoticons, handwriting, audio files, video files, audio/video files, image files, metadata, and so forth. As such, the theme manager component 110 may be capable of searching the theme library 104 for the theme 120 using key words or derived key words in the form of textual information, multimedia information (e.g., an image), or a combination of textual information and multimedia information. The embodiments are not limited in this context.

In various embodiments, the theme 120 may comprise a collection of attributes and graphical elements that can be utilized to customize a look and feel of an interface for a software program, such as an application program, a system program (e.g., an operating system), a web browser, a web page, and so forth. The theme 120 controls a visual composition and temporal behavior of a user interface. The theme 120 allows multiple attributes and graphical elements of an interface to be changed all at once, thereby reducing or avoiding a need for a user to change each attribute and graphical element individually. For instance, the theme 120 may specify a particular set of colors, text size, font, static or moving graphics or video, page layout, and other stylistic elements that can be utilized to customize the visual and/or audio appearance of an interface for a software program. The theme 120 typically defines certain attributes and graphical elements of an interface to reflect a unifying concept. For instance, a beach theme might have pictures of a beach, icons rendered as beach items (e.g., shells, boats), font colors in the form of sand white and water blue, banner advertisements for beach products, and so forth. Attributes and graphical elements for a given theme 120 may vary according to a specific software program as desired for a particular implementation. The embodiments are not limited in this context.

In various embodiments, the system 100 may comprise the user interface component 130. The user interface component 130 may be generally arranged to generate various GUI views using one or more themes for various programs or services implemented on a given computing device. The programs and services may comprise, for example, system programs, application programs, business application programs, search applications, document management programs, weblogs (blogs), word processing programs, spreadsheet programs, database programs, drawing programs, document sharing programs, message applications, web services, web applications, web services, web feeds such as really simple syndication (RSS), web browsers, SNS programs, and/or other types of programs, applications or services utilizing a GUI. In one embodiment, for example, the user interface component 130 may generate a GUI view 140 with one or more GUI elements generated in accordance with the theme 120. As the theme 120 changes based on different messages 102, the user interface component 130 may dynamically change the GUI view 140 with a new theme 120.

Figure 2:
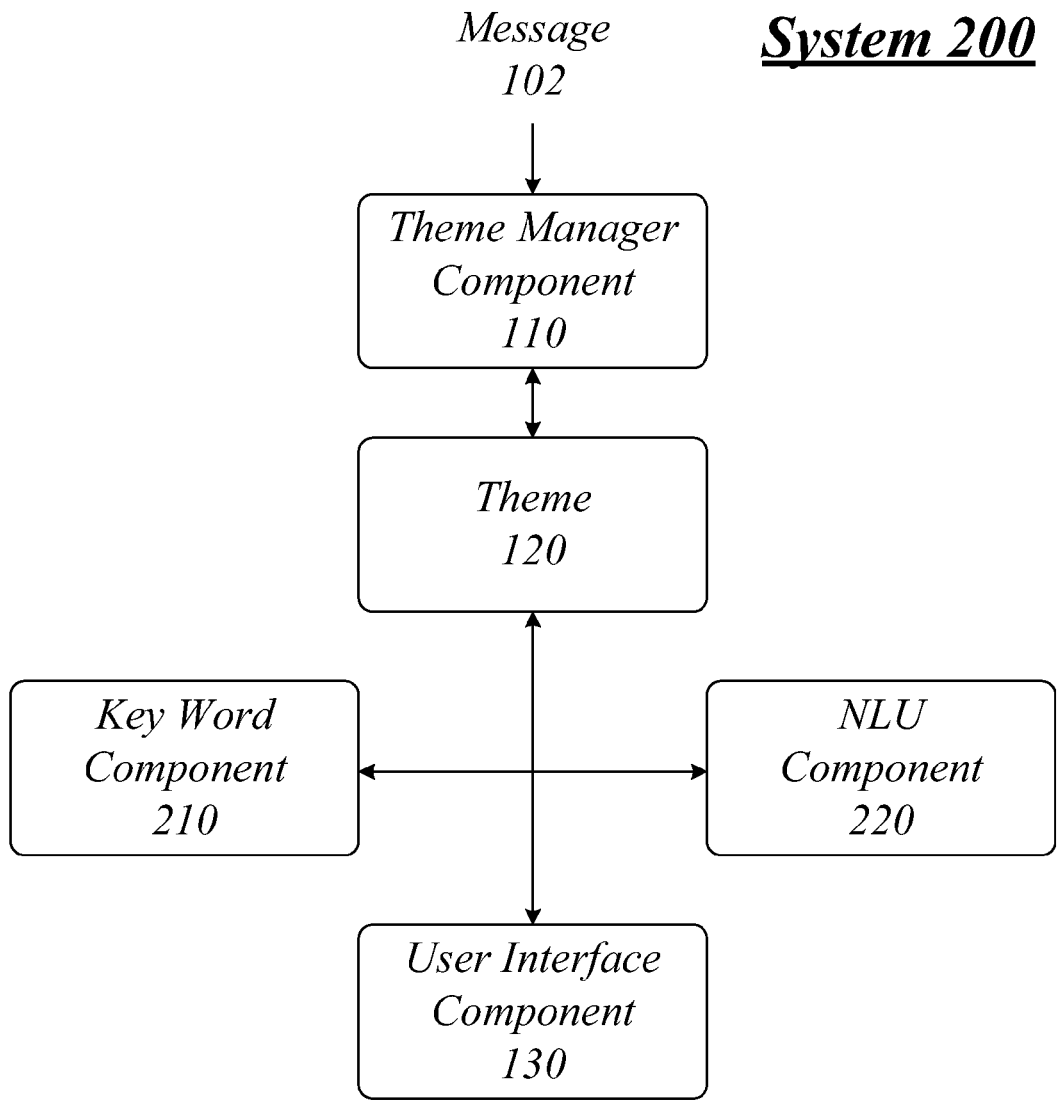
FIG. 2 illustrates an embodiment of a second dynamic theme selection system similar to the first dynamic theme selection system with additional language recognition components.

FIG. 2 illustrates a block diagram of a system 200 to dynamically manage themes for a GUI. The system 200 may be similar to the system 100, and may further comprise a key word component 210 and a natural language understanding component 220. The theme manager component 110 may use (or call) the key word component 210 and/or the natural language understanding component 220 to find personal information about the message author 106.

In one embodiment, for example, the theme manager component 110 may process the message 102 to find personal information about the message author 106 using the key word component 210. The key word component 210 may be generally arranged to determine personal information about the message author 106 from message content of the message 102 based on one or more key words within the message content. In one embodiment, for example, the key word component 210 may parse the message content of the message 102 for one or more key words indicating personal information about the message author 106. A key word may comprise certain lexical categories of words that have a higher probability of conveying meaning about the message author 106, such as main words within a sentence. Examples of key words may include lexical categories such as nouns or verbs. A common word may comprise certain lexical categories of words that have a lower probability of conveying meaning about the message author 106, such as transition or connecting words in a sentence. Examples of common words may include lexical categories such as prepositions, conjunctions and determiners. What precisely constitutes key words or common words may be specific to a given application. Special grammar rules may be used to programmatically determine key words from common words as desired for a given implementation. The theme manager component 110 may use (or call) the key word component 210 to search the message 102 to identify key words from among the common words using special grammar rules. The theme manager component 110 may then use the key words to locate a particular theme associated with the one or more key words stored in the theme library 104. In this case, the key words typically remain the same as those originally found in the message 102.

In one embodiment, for example, the theme manager component 110 may process the message 102 to find personal information about the message author 106 using the natural language understanding component 220. The natural language understanding component 220 may be generally arranged to determine personal information about the message author 106 from message content of the message 102 based on interpretations of the message content. In one embodiment, for example, the natural language understanding component 220 may implement more complex language recognition techniques in order to more accurately discover personal information about the message author 106. In some cases, the actual words in the message 102 may not accurately reflect personal information about the message author 106, such as when certain words are used colloquially or to convey irony. In such cases, the key word component 210 using key words alone may not result in accurate selection of an appropriate theme 120. In one embodiment, the theme manager component 110 may use (or call) the natural language understanding component 220 implementing various natural language understanding techniques to derive a machine comprehension meaning for the message 102. The natural language understanding component 220 may receive the message 102 as input, process message content from the message 102 to find a machine comprehension meaning for the message 102, and output one or more key words representing the machine comprehension meaning. The theme manager component 110 may use the derived key words to locate a particular theme associated with the one or more derived key words stored in the theme library 104. In this case, the one or more derived key words may not necessarily match any of the words originally present in the message 102.

Natural language understanding, in general, is a subfield of natural language processing in artificial intelligence that focuses on machine reading comprehension. Common components of a natural language understanding system may include a lexicon with a suitable ontology of a given language (e.g., English) and a parser and grammar rules to break sentences into an internal representation. A natural language understanding system may also include a semantic theory to guide the machine reading comprehension. Advanced applications of natural language understanding systems also attempt to incorporate logical inference within their framework. This is generally achieved by mapping the derived meaning into a set of assertions in predicate logic, then using and logical deduction to arrive at conclusions. Natural language understanding systems based on functional languages such as Lisp typically include a subsystem for the representation of logical assertions, while logic oriented systems such as those using the language Prolog generally rely on an extension of the built in logical representation framework. The natural language understanding component 220 may use any type of natural language understanding system programmed specifically for interpreting various types of message content found in a message 102.

The natural language understanding component 220 may process message content from the message 102 using a natural language understanding algorithm to output a meaning for the message 102. The natural language understanding system may output the derived meaning in the form of one or more derived key words. The use of a natural language understanding system to derive a meaning for the message 102 may facilitate a more accurate selection of personal information about the message author 106. For instance, assume the message 102 included message content comprising "work today was no day at the beach." Utilization of the key word component 210 may output a key word such as "beach" thereby causing the theme manager component 110 to incorrectly select a beach theme as the theme 120 conveying a happy mood for the message author 106, when in fact the message author 106 may be angry about her work day and would desire a theme 120 conveying her anger. A natural language understanding system may be arranged to detect such nuances in meaning from the message 102, and output a derived key word such as "anger" or multiple derived key words such as "very angry." The theme manager component 110 may then search for an anger theme associated with the derived key word "anger" or derived key words "very angry" in the theme library 104, and select an appropriate anger theme as the theme 120. For example, an anger theme may have parameters controlling a user tile to modify facial characteristics of a picture of the message author 106 to convey a feeling of anger or resentment, modifying background colors from lighter colors (e.g., blue) to darker colors (e.g., red), and providing animations of a person stamping her feet or lightning bolts striking an object.

In one embodiment, the theme manager component 110 may select whether to use the key word component 210 or the natural language understanding component 220 based on various selection rules and selection criteria. For instance, the selection rules and selection criteria may be based on one or more attributes of the message 102. The key word component 210 has a benefit of using less computational resources at a cost of finding less precise personal information about the message author 106. The natural language understanding component 220 has a benefit of finding more accurate personal information about the message author 106 at a cost or greater computational resources. To enhance benefits of both the key word component 210 and the natural language understanding component 220, while reducing associated costs, the theme manager component 110 may utilize logic to make a threshold determination as to which of the components 210, 220 to use for a given message 102.

In one embodiment, for example, the theme manager component 110 may implement a value for a selection criterion of a threshold number of words in a message 102, and logic in the form of a selection rule that indicates selection based on a comparison of the actual number of words in the message 102 to the threshold number of words. For instance, the theme manager component 110 may determine that a given message 102 is relatively long based on word count (e.g., word count >10 words), thereby increasing a probability of error when using the key word component 210, and therefore may select the natural language understanding component 220 to increase accuracy of personal information about the message author 106. Similarly, the theme manager component 110 may determine that a given message 102 is relatively short based on word count (e.g., word count <10 words), thereby decreasing a probability of error when using the key word component 210, and therefore may select the key word component 210 to decrease a computational load for a computing device. The theme manager component 110 may use other selection criteria for threshold determinations, such as a time when a message 102 is received, a number of message recipients, a particular messaging application or messaging service used to generate or deliver a message 102, a number of messages 102 received within a given time interval, a priority level for a message 102, a number and type of attachments for a message 102, control information for the message 102, and any other criteria useful for intelligent selection between the components 210, 220. The embodiments are not limited in this context.

In one embodiment, the theme manager component 110 may process the message 102 to find personal information about the message author 106 using both the key word component 210 and the natural language understanding component 220. For instance, the theme manager component 110 may use the key word component 210 as a default setting, and evaluate the key word results from the key word component 210. The theme manager component 110 may have a selection criteria of a threshold number of key words, and a selection rule that indicates that when a number of key words outputted from the key word component 210 is greater than a threshold number of key words (e.g., key words >3) indicating potential conflicts or confusion in meaning of the message 102, the theme manager component 110 calls the natural language understanding component 220 to process the message 102 to find more accurate personal information about the message author 106. Other selection criteria may be used to determine when appropriate to use both the key word component 210 and the natural language understanding component 220, and the embodiments are not limited in this context.

The theme manager component 110 may use the key word component 210 and/or the natural language understanding component 220 to find different types of personal information about the message author 106 using message content of the message 102. The message content may comprise any information associated with the message 102, including control information used to route the message 102, a list of message recipients, a subject line, attachments, metadata, and so forth. The message content may further comprise any textual information within a message body of the message 102, including words, phrases, punctuation, grammar, syntax, metadata, and so forth. The message content may further comprise any multimedia information within a message body of the message 102, including pictures, graphics, icons, emoticons, handwriting, audio files, video files, audio/video files, image files, metadata, and so forth. Multimedia message content may be processed using the key word component 210 by analyzing and selecting certain multimedia information as one or more key words. For instance, assume a message body includes an emoticon of a smiley face. The key word component 210 may select an image of the smiley face emoticon, or a textual equivalent for the smiley face emoticon, as a key word. The theme library 104 may store an image of the smiley face emoticon, or its textual equivalent, with an associated theme. In this manner, the theme manager component 110 may perform multimedia (e.g. image) searches as well as word searches for associated themes. Additionally or alternatively, a natural language understanding algorithm for the natural language understanding component 220 modified to process multimedia information (e.g., using visual recognition techniques, speech-to-text techniques, image analysis, etc.). The embodiments are not limited in this respect.

The theme manager component 110 may use the key word component 210 and/or the natural language understanding component 220 to find different types of personal information about the message author 106. Personal information may include any information that relates to a particular person or individual. In one embodiment, for example, the personal information may comprise a personal attribute, property or characteristic of the message author. In one embodiment, for example, the personal information may comprise an environmental attribute for the message author 106. Other types of personal information may be determined as well.

In one embodiment, the personal information may comprise a personal attribute of the message author 106. A personal attribute of the message author 106 may refer to some characteristic or property of the message author 106 as an individual. Examples of personal attributes may include without limitation a physical attribute of the message author 106, a mental attribute of the message author 106, an emotional attribute of the message author 106, and so forth. Physical attributes may relate to information about a physical state of a body for a person, including hair, eye color, height, weight, temperature, and other physical characteristics. Physical attributes may also relate to information about movement or activity of a body for a person, such as moving, running, jumping, surfing, golfing, and so forth. Emotional attributes may relate to information about an emotional state or feelings of a person, including happiness, sadness, affection, fear, anger, and other emotions. Mental attributes may relate to information about a mental state of a person, such as reading, thinking, analyzing, and so forth.

In one embodiment, the personal information may comprise an environmental attribute for the message author 106. An environmental attribute of the message author 106 may refer to some attribute, property or characteristic of an environment surrounding the message author 106. Examples of environmental attributes may include a location, weather or climate, man-made objects (e.g., a desk, chair, computer, etc.), natural objects (e.g., mountains, beach, ocean, etc.), and any other characteristics of a surrounding environment for a person.

The personal information including any personal attributes and/or environmental attributes may be used as a basis for a theme selected by the theme manager component 110. The theme manager component 110 may use the key word component 210 and/or the natural language understanding component 220 to programmatically find key words or derived key words representative of one or more of the personal attributes and/or environmental attributes. In one embodiment, the theme manager component 110 may use the key word component 210 and/or the natural language understanding component 220 to find a single key word or derived key word attempting to summarize a single potential meaning for the message 102. In one embodiment, the theme manager component 110 may use the key word component 210 and/or the natural language understanding component 220 to find multiple key words or derived key words to reflect multiple potential meanings for the message 102. The theme manager component 110 may use the single or multiple key words or derived key words to search and retrieve a theme 120 from the theme library 104.

Figure 3:
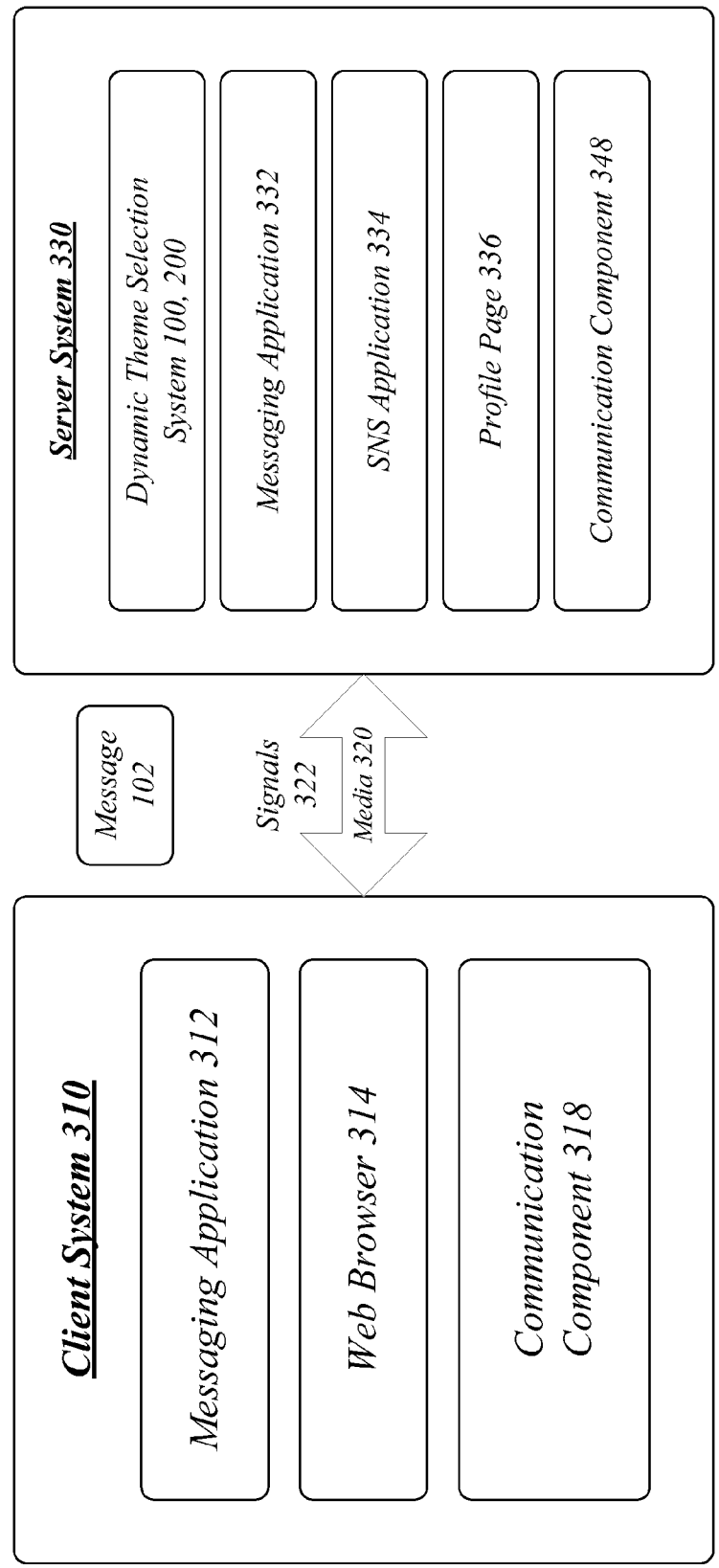
FIG. 3 illustrates an embodiment of a client-server distributed system for implementing one or both dynamic theme selection systems of described with reference to FIGS. 1, 2.

FIG. 3 illustrates a block diagram of a distributed system 300. The distributed system 300 may distribute portions of the structure and/or operations for the systems 100, 200 across multiple computing entities. Examples of distributed system 300 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, for example, the distributed system 300 may be implemented as a client-server system. A client system 310 may implement a messaging application 312 and a communication component 316. A server system 330 may implement one or both of the dynamic theme selection systems 100, 200. The client system 310 and the server system 330 may communicate with each over a communications media 320 using communications signals 322 via the communications components 318, 348. In one embodiment, for example, the communications media may comprise a public or private network. In one embodiment, for example, the communications signals 322 may comprise wired or wireless signals. Computing aspects of the client system 310 and the server system 330 may be described in more detail with reference to FIG. 7. Communications aspects for the distributed system 300 may be described in more detail with reference to FIG. 8.

In various embodiments, the client system 310 may comprise the messaging application 312. The messaging application 312 may comprise any type of messaging application, such as a unified messaging (UM) application, an e-mail application, a voicemail application, an instant messaging (IM) application, a group IM application, presence application, audio-video conferencing application, short message service (SMS) application, multimedia message service (MMS) application, and/or other types of communications and/or messaging programs, applications, or services in accordance with the described embodiments.

In various embodiments, the client system 310 may comprise a web browser 314. The web browser 314 may comprise any web browser suitable for use in accessing web applications provided by the server system 330. Examples of suitable web browsers may include MICROSOFT INTERNET EXPLORER®, GOOGLE® CHROME and APPLE® SAFARI, to name just a few. The embodiments are not limited in this context.

In various embodiments, the server system 330 may comprise or employ one or more server computing devices and/or server programs that operate to perform various methodologies in accordance with the described embodiments. For example, when installed and/or deployed, a server program may support one or more server roles of the server computing device for providing certain services and features. Exemplary server systems 330 may include, for example, stand-alone and enterprise-class server computers operating a server OS such as a MICROSOFT® OS, a UNIX® OS, a LINUX® OS, or other suitable server-based OS. Exemplary server programs may include, for example, communications server programs such as MICROSOFT WINDOWS LIVE or MICROSOFT OFFICE COMMUNICATIONS SERVER (OCS) for managing incoming and outgoing messages, messaging server programs such as MICROSOFT EXCHANGE SERVER for providing unified messaging (UM) for e-mail, voicemail, VoIP, instant messaging (IM), group IM, enhanced presence, and audio-video conferencing, and/or other types of programs, applications, or services in accordance with the described embodiments.

In the illustrated embodiment shown in the distribute system 300, the server system 330 may implement a messaging application 332 similar to the messaging application 312. The messaging author 106 may access and use the messaging application 332 of the server system 330 using the web browser 314 as an alternative to the messaging application 312 of the client system 310.

In one embodiment, the server system 330 may implement a SNS application 334. Examples for the SNS application 334 may include without limitation MICROSOFT WINDOWS LIVE, MYSPACE, FACEBOOK, LINKEDIN, TWITTER, BEBO, and any other social networking services consistent with the described embodiments. The SNS application 334 may allow a user, such as the message author 106, to have a user account with a profile page 336. The profile page 336 may comprise the GUI view 140 having different GUI elements such as profile information about the message author 106, including names, nicknames, messages, events, photos, friends, applications, game, groups, friends currently online, networks, relationship status, bumper stickers, gifts, and other personal information relevant to the message author 106. Furthermore, the profile page 336 may display the GUI view 140 using different themes, including the theme 120.

As shown in FIG. 3, the message author 106 may generate one or more messages 102 via the messaging application 312 and/or the messaging application 332 (e.g., via the web browser 314). The message 102 may be received by the dynamic theme selection systems 100, 200. The theme manager component 110 of the dynamic theme selection systems 100, 200 may select a theme 120 based on the message 102, and forward the selected theme 120 to the user interface component 130. The user interface component 130 of the dynamic theme selection systems 100, 200 may generate the GUI view 140 for the profile page 336 of the SNS application 334. As new messages 102 are received by the dynamic theme selection system 100, 200, the theme 120 and the resulting GUI view 140 for the profile page 336 of the SNS application 334 may change as well, thereby making the profile page 336 dynamic and responsive to personal information for the message author 106.

It may be appreciated that one or more components of the dynamic theme selection systems 100, 200 may be implemented independently or as part of another program, such as the SNS application 334. In the latter case, for instance, the theme manager component 110 may select a theme 120 and forward the theme 120 to the SNS application 334 for rendering by the user interface component 130 implemented as part of the native GUI renderer of the SNS application 334. The embodiments are not limited in this context.

Figure 4:
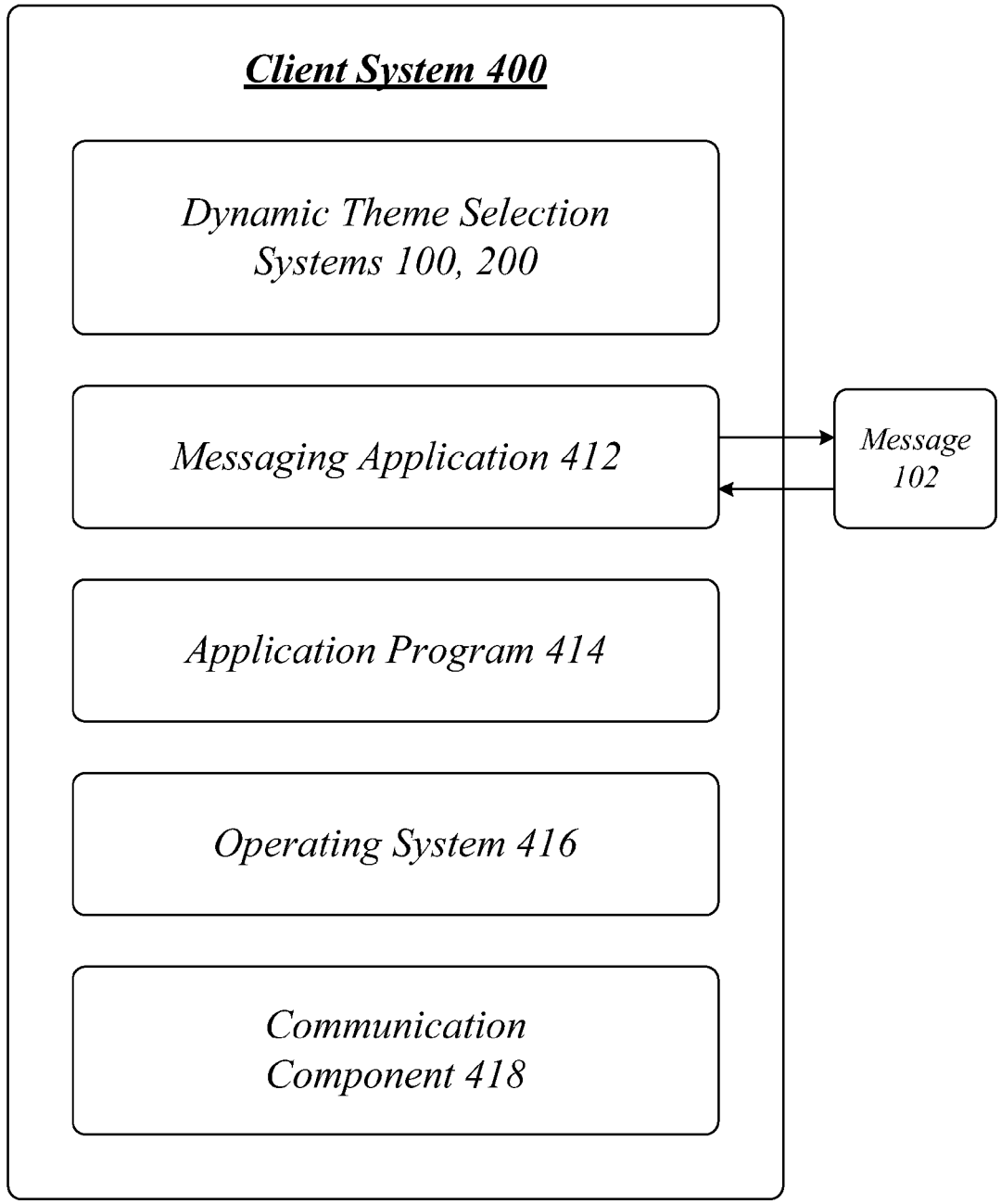
FIG. 4 illustrates an embodiment of a centralized system for implementing one or both dynamic theme selection systems described with reference to FIGS. 1, 2.

FIG. 4 illustrates a block diagram of a client system 400. The client system 400 may comprise a centralized system arranged to implement all of the structure and/or operations for the dynamic theme selection systems 100, 200 in a single computing entity. In one embodiment, for example, the client system 400 may implement the structure and/or operations for the dynamic theme selection systems 100, 200 entirely within a single computing device.

In the illustrated embodiment shown in FIG. 4, the client system 400 may comprise one or both of the dynamic theme selection systems 100, 200, a messaging application 412, an application program 414, and a communication component 418. The messaging application 412 and the communication component 418 may be the same or similar to corresponding messaging application 312 and communication component 318 as described with reference to FIG. 3. The application program 414 may comprise any type of software application utilizing GUI views. The operating system 416 may comprise any operating system suitable for a computing device.

The client system 400 may illustrate a case where a theme 120 used by the application program 414 and/or the operating system 416 may be dynamically changed based on messages sent or received from the messaging application 412. In this manner, themes for the client system 400 may be modified based on messages sent by a message author 106 utilizing the client system 400, as well as messages received from a different message author 106 utilizing a remote device and received by the client system 400.

In one embodiment, the dynamic theme selection systems 100, 200 may select and modify a theme 120 for the client system 400 based on messages authored and sent by the message author 106 using the client system 400. For example, the message author 106 may utilize the messaging application 412 to send a message 102 to a message recipient at a remote device via the communication component 418. In addition to sending the message 102 to the message recipient from the messaging application 412, a copy of the message 102 may be received by the dynamic theme selection systems 100, 200. This may be accomplished using logic implemented by the messaging application 412 or the dynamic theme selection systems 100, 200. The theme manager component 110 of the dynamic theme selection systems 100, 200 may select a theme 120 based on the message 102, and forward the selected theme 120 to the user interface component 130. The user interface component 130 of the dynamic theme selection systems 100, 200 may generate the GUI view 140 for the application program 414 and/or the operating system 416. In this manner, a theme 120 for various software programs implemented by the client system 400 as used by the message author 106 may be dynamically changed based on messages sent by the message author 106. As new messages 102 are received by the dynamic theme selection system 100, 200, the theme 120 and the resulting GUI view 140 for the application program 414 may change as well, thereby making the application program 414 dynamic and responsive to personal information for the message author 106.

In one embodiment, the dynamic theme selection systems 100, 200 may select and modify a theme 120 for the client system 400 based on messages received by a user of the client system 400 as authored and generated by a message author 106 that is not using the client system 400. For example, a user may utilize the messaging application 412 to receive a message 102 from the message author 106 as a message recipient via the communication component 418. In addition to receiving the message 102 at the messaging application 412, a copy of the message 102 may be received by the dynamic theme selection systems 100, 200. This may be accomplished using logic implemented by the messaging application 412 or the dynamic theme selection systems 100, 200. The theme manager component 110 of the dynamic theme selection systems 100, 200 may select a theme 120 based on the message 102, and forward the selected theme 120 to the user interface component 130. The user interface component 130 of the dynamic theme selection systems 100, 200 may generate the GUI view 140 for the application program 414 and/or the operating system 416. In this manner, a theme 120 for various programs implemented by the client system 400 as used by a message recipient may be dynamically changed based on messages received from the message author 106. As new messages 102 are received by the dynamic theme selection system 100, 200, the theme 120 and the resulting GUI view 140 for the application program 414 may change as well, thereby making the application program 414 dynamic and responsive to personal information for the message author 106.

FIG. 5A illustrates an embodiment of a GUI view 500. The GUI view 500 may be representative of the GUI view 140 generated for the profile page 336 by the user interface component 130. The GUI view 500 may illustrate a version of the GUI view 140 for the profile page 336 before a theme 120 is applied to the GUI view 140.

In the illustrated embodiment shown in FIG. 5A, the GUI view 500 may comprise various GUI elements providing information about a user named "John Doe." The information about John may be presented as various types of multimedia information in the form of pictures, graphics, images, audio, video, audio/video, text, hyperlinks, hyperlinks, controls, icons, pointers, objects, and other GUI elements capable of modification within a GUI view. Further, the multimedia information about John may be rendered in accordance with certain attributes and graphical elements as defined by the theme 120. For instance, textual information may be presented in a certain color, font and font size. Graphics or photos may change size or color formats. In some cases, certain existing multimedia information may be modified. In other cases, certain existing multimedia information may be replaced.

As shown, the GUI view 500 may include a display area 502 to display a status message 504 generated by John as the message author 106. The GUI view 500 may also include a display area 506 capable of displaying a graphic which is not currently shown by the GUI view 500 as indicated by the dashed lines. The GUI view 500 may further include a display area 508 capable of displaying a picture or image 510 of John while frowning. Display area 508 may sometimes be referred to as a user tile. The user interface component 130 may be arranged to modify and/or show a graphic for the display area 506 and the picture or image 510, and in accordance with a theme 120 selected when the status message 504 is posted by John as the message author 106.

FIG. 5B illustrates an embodiment of a GUI view 500. The GUI view 500 may be representative of the GUI view 140 generated for the profile page 336 by the user interface component 130. The GUI view 500 may illustrate a version of the GUI view 140 for the profile page 336 after a theme 120 is applied to the GUI view 140. As shown in the GUI view 500 of the FIG. 5B, John as the message author 106 has posted a status message 504 rendered in text as "I am having fun at the beach!" in the display area 502. The dynamic theme selection systems 100, 200 may receive the status message 504 and select a beach theme as the theme 120. The user interface component 130 may generate the GUI view 140 for the profile page 336 using the theme 120 to show a beach theme having a sail boat displayed in the previously vacant display area 506. Furthermore, the GUI view 140 may modify the picture or image 510 of the display area 508 to show a picture or image of John while smiling. It may be appreciated that any number of attributes or graphical elements for the profile page 336 might be modified in accordance with a given theme 120, and the embodiments are not limited in this context.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 6 illustrates one embodiment of a logic flow 600. The logic flow 600 may be representative of some or all of the operations executed by one or more embodiments described herein, such as the dynamic theme selection systems 100, 200.

In the illustrated embodiment shown in FIG. 6, the logic flow 600 may receive a message having message content from a message author at block 602. For example, the theme manager component 110 may receive the message 102 having message content from the message author 106. The theme manager component 110 may receive the message 102, for example, from one of the messaging applications 312, 332 or 412. An example for the message 102 may include a status message for the SNS application 334, an e-mail message, an IM message, a chat message, a SMS message, a MMS message, a presence message, and so forth.

The logic flow 600 may determine personal information about the message author from the message content of the message at block 604. For example, the theme manager component 110 may determine personal information about the message author 106 from the message content of the message 102. The theme manager component 110 may determine personal information about the message author 106, for example, by utilizing the key word component 210 and/or the natural language understanding component 220. For instance, assume the message content for the message 102 is "I am in London on vacation." The key word component 210 may parse the message content "I am in London on vacation," and outputs the key word "London" which is personal information in the form of an environmental attribute identifying a location.

The logic flow 600 may select a theme based on the personal information at block 606. For example, the theme manager component 110 may select a theme 120 based on one or more key words or derived key words as determined by the respective key word component 210 and the natural language understanding component 220. The theme manager component 110 may search the theme library 104 using the one or more key words or derived key words, and retrieve a theme 120 associated with the one or more key words or derived key words. For example, assume the theme library 104 stores the key word of "London" with a theme 120 having a British theme, which includes a picture of England, icons in the form of prominent tourist attractions in London, the colors red, white and blue for the British flag, and a font selection for an Old English font. The theme manager component 110 may select the theme 120 comprising a British theme as associated with the key word "London."

The logic flow 600 may display a user interface view with the selected theme at block 608. For example, the theme manager component 110 may output the selected theme 120 to the user interface component 130. Continuing with the previous example, the selected theme 120 may comprise a British theme, and the user interface component 130 may generate and display the GUI view 140 with the selected theme 120 using the various attributes and graphical elements associated with the British theme. The user interface component 130 may be implemented as a stand-alone software component or integrated as part of a GUI interface native to a given software program.

Figure 7:
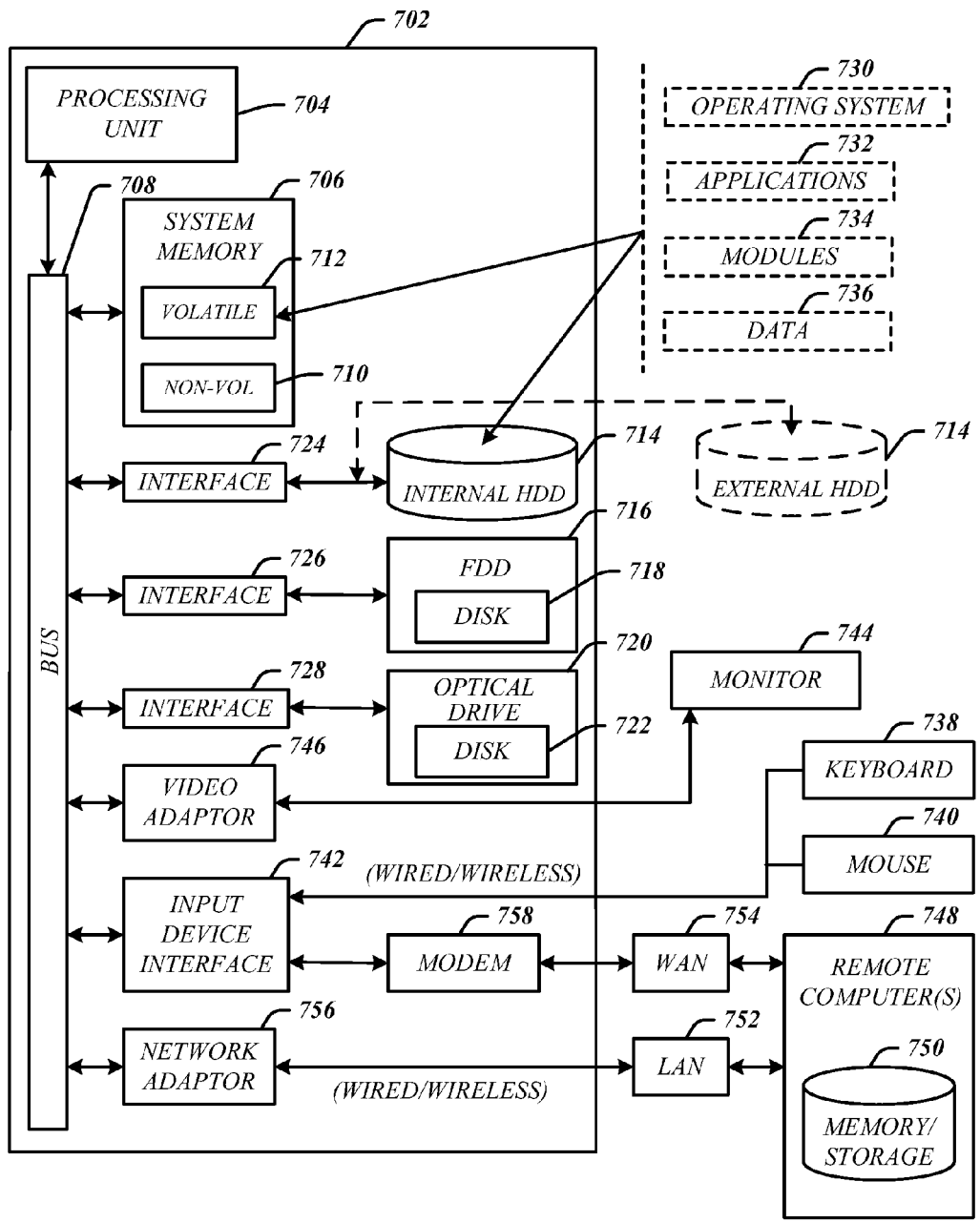
FIG. 7 illustrates an embodiment of a computing architecture for implementing a dynamic theme selection system.

FIG. 7 illustrates an embodiment of an exemplary computing architecture 700 suitable for implementing various embodiments as previously described. The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi-processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The system memory 706 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media, including an internal hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. The one or more application programs 732, other program modules 734, and program data 736 can include, for example, the dynamic theme selection systems 100, 200, the theme manager component 110, the theme 120, the key word component 210, the natural language understanding component 220, the user interface component 130, the messaging application 312, 332 and 412, the web browser 314, the SNS application 334, and so forth.

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
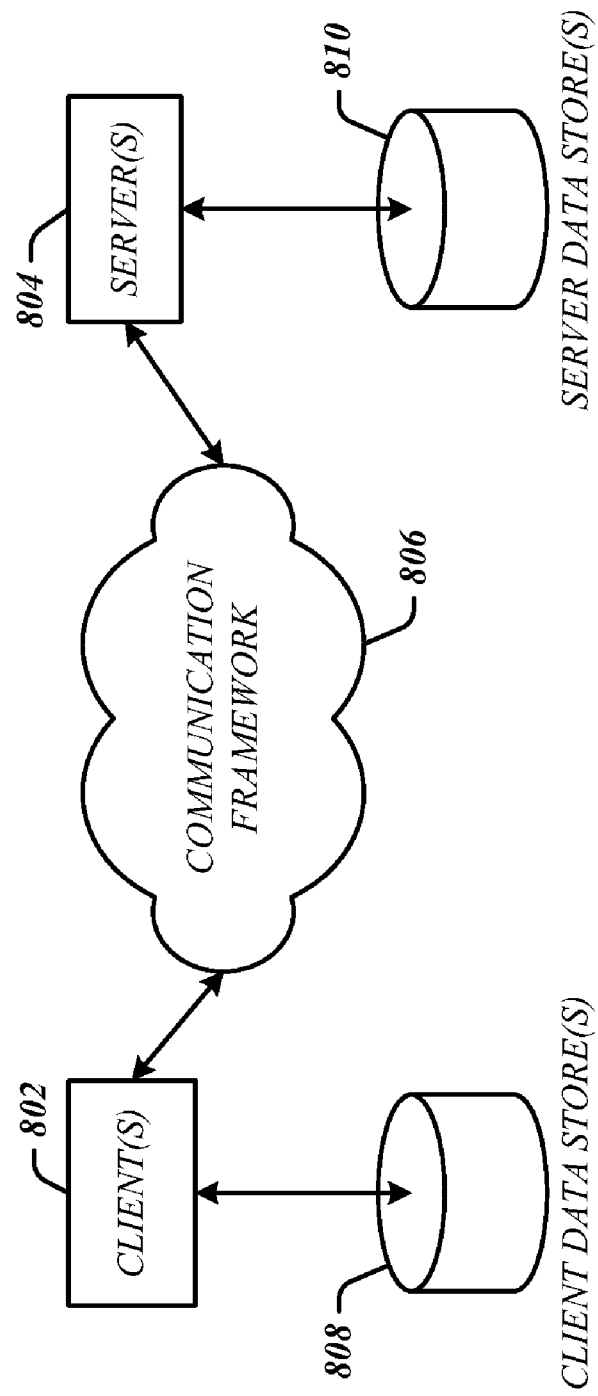
FIG. 8 illustrates an embodiment of a communications architecture for implementing a dynamic theme selection system.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 may implement the client systems 310, 400. The servers 804 may implement the server system 330. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 802 and the servers 804 may include various types of standard communication elements designed to be interoperable with the communications framework 806, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 802 and a server 804 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
receiving a message having message content from a message author;
selecting to use one of a natural language understanding (NLU) component and a key word component based on at least one selection rule and at least one attribute of the message, wherein the at least one attribute of the message is number of words, and wherein the selection rule comprises selecting to use the NLU component when the number of words exceeds a threshold number of words, and selecting the key word component when the number of words is less than the threshold number of words;
determining personal information about the message author from the message content of the message using the selected NLU component or the key word component;
selecting a theme based on the personal information; and
displaying a user interface view with the selected theme to the message author.

2. The computer-implemented method of claim 1, comprising receiving a status message for a social networking service.

3. The computer-implemented method of claim 1, comprising determining personal information about the message author from the message content of the message based on one or more key words from the message content.

4. The computer-implemented method of claim 1, comprising determining personal information about the message author from the message content of the message based on one or more derived key words from the message content.

5. The computer-implemented method of claim 1, comprising determining personal information about the message author from the message content of the message, the personal information comprising a personal attribute of the message author.

6. The computer-implemented method of claim 1, comprising determining personal information about the message author from the message content of the message, the personal information comprising a personal attribute of the message author, the personal attribute comprising a physical attribute of the message author.

7. The computer-implemented method of claim 1, comprising determining personal information about the message author from the message content of the message, the personal information comprising a personal attribute of the message author, the personal attribute comprising a mental attribute of the message author.

8. The computer-implemented method of claim 1, comprising determining personal information about the message author from the message content of the message, the personal information comprising a personal attribute of the message author, the personal attribute comprising an emotional attribute of the message author.

9. The computer-implemented method of claim 1, comprising determining personal information about the message author from the message content of the message, the personal information comprising an environmental attribute of the message author.

10. The computer-implemented method of claim 1, comprising retrieving the theme associated with one or more key words or derived key words from a theme library.

11. An article comprising a storage medium containing instructions that when executed enable a system to:
receive a message having message content from a message author, select to use one of a natural language understanding (NLU) component and a key word component based on at least one selection rule and at least one attribute of the message, determine personal information about the message author from the message content of the message using the selected NLU component or the key word component, select a theme based on the personal information, and display a user interface view with the selected theme to the message author; wherein
the at least one attribute of the message is number of words, and wherein the selection rule comprises selecting to use the NLU component when the number of words exceeds a threshold number of words, and selecting the key word component when the number of words is less than the threshold number of words.

12. An article comprising a storage medium containing instructions that when executed enable a system to:
receive a message having message content from a message author, select to use one of a natural language understanding (NLU) component and a key word component based on at least one selection rule and at least one attribute of the message, determine personal information about the message author from the message content of the message, using the key word component, based on one or more key words from the message content, retrieve the theme associated with the one or more key words from a theme library, and display a user interface view with the selected theme to the message author; wherein
the at least one attribute of the message is number of words, and wherein the selection rule comprises selecting to use the NLU component when the number of words exceeds a threshold number of words, and selecting the key word component when the number of words is less than the threshold number of words.

13. An article comprising a storage medium containing instructions that when executed enable a system to:

receive a message having message content from a message author, select to use one of a natural language understanding (NLU) component and a key word component based on at least one selection rule and at least one attribute of the message, determine personal information about the message author from the message content of the message, using the selected NLU component, based on one or more derived key words from the message content, retrieve the theme associated with the one or more derived key words from a theme library, and display a user interface view with the selected theme to the message author; wherein the at least one attribute of the message is number of words, and wherein the selection rule comprises selecting to use the NLU component when the number of words exceeds a threshold number of words, and selecting the key word component when the number of words is less than the threshold number of words.

14. An article comprising a storage medium containing instructions that when executed enable a system to:

receive a message having message content from a message author, select to use one of a natural language understanding (NLU) component and a key word component based on at least one selection rule and at least one attribute of the message, determine personal information about the message author from the message content of the message using the selected NLU component or the key word component, the personal information comprising a personal attribute of the message author, the personal attribute comprising a physical attribute of the message author, a mental attribute of the message author, and an emotional attribute of the message author, and display a user interface view with the selected theme to the message author; wherein the at least one attribute of the message is number of words, and wherein the selection rule comprises selecting to use the NLU component when the number of words exceeds a threshold number of words, and selecting the key word component when the number of words is less than the threshold number of words.

15. An article comprising a storage medium containing instructions that when executed enable a system to:

receive a message having message content from a message author, select to use one of a natural language understanding (NLU) component and a key word component based on at least one selection rule and at least one attribute of the message, determine personal information about the message author from the message content of the message using the selected NLU component or the key word component, the personal information comprising an environmental attribute of the message author, and display a user interface view with the selected theme to the message author; wherein the at least one attribute of the message is number of words, and wherein the selection rule comprises selecting to use the NLU component when the number of words exceeds a threshold number of words, and selecting the key word component when the number of words is less than the threshold number of words.

16. An apparatus, comprising:

a processor; and a memory communicatively coupled to the processor, the memory storing a theme manager component, a natural language understanding (NLU) component, a key word component, and a user interface component, the theme manager component when executed by the processor operative to receive a message from a message author, select to use one of the NLU component or the key word component based on at least one selection rule and at least one attribute of the message, determine message content using the selected NLU component or key word component, and select a theme based on message content from the message, and the user interface component when executed by the processor operative to dynamically display a user interface view with the selected theme to the message author; wherein the at least one attribute of the message is number of words, and wherein the selection rule comprises selecting to use the NLU component when the number of words exceeds a threshold number of words, and selecting the key word component when the number of words is less than the threshold number of words.

17. The apparatus of claim 16, comprising a key word component operative to determine personal information about the message author from the message content of the message based on one or more key words from the message content.

18. The apparatus of claim 16, comprising a natural language understanding component operative to determine personal information about the message author from the message content of the message based on one or more derived key words from the message content.

19. The apparatus of claim 16, comprising a theme library to store one or more themes associated with one or more key words or derived key words from the message content of the message.

* * * * *